United States Patent

[11] 3,616,862

| [72] | Inventor | Ary Van Der Lely<br>10, Weverskade, Maasland, Netherlands |
|---|---|---|
| [21] | Appl. No. | 769,937 |
| [22] | Filed | Oct. 23, 1968 |
| [45] | Patented | Nov. 2, 1971 |
| [32] | Priority | Nov. 1, 1967 |
| [33] | | Netherlands |
| [31] | | 6714826 |

[54] SOIL-CULTIVATING IMPLEMENTS
7 Claims, 8 Drawing Figs.

[52] U.S. Cl. .................................................. 172/47,
172/49, 172/59, 172/68
[51] Int. Cl. .......................................... A01b 33/02,
A01b 29/02
[50] Field of Search ........................................ 172/68, 72,
32, 47, 59, 111, 125, 35, 48, 49, 57, 110, 613, 658,
691, 694, 697, 657

[56] References Cited
UNITED STATES PATENTS

| 75,310 | /1868 | Standish | 172/49 |
|---|---|---|---|
| 127,453 | /1872 | Bowen | 172/48 X |
| 2,582,364 | 1/1952 | Tice | 172/49 |
| 2,651,246 | 9/1953 | Peters et al. | 172/111 X |
| 3,111,917 | 11/1963 | Dawrs | 172/111 X |
| 3,115,190 | 12/1963 | Listiak | 172/49 |
| 3,387,436 | 6/1968 | Kasper | 172/111 X |
| 880,457 | 2/1908 | Koeszegi | 172/68 X |
| 1,176,098 | 3/1916 | Robbins | 172/72 |
| 2,088,141 | 7/1937 | Royston | 172/111 X |
| 2,473,770 | 6/1949 | Seaman | 172/32 X |
| 3,039,208 | 6/1962 | Oglesby et al. | 172/47 X |
| 3,190,246 | 6/1965 | Neal | 172/68 X |

FOREIGN PATENTS

| 989,461 | 4/1965 | Great Britain | 172/111 |
|---|---|---|---|
| 745,671 | 2/1956 | Great Britain | 172/47 |

*Primary Examiner*—Clyde I. Coughenour
*Attorney*—Mason, Mason, & Albright

ABSTRACT: This invention relates to soil cultivating implements comprising a mobile frame and a plurality of soil-working members that are mounted in the frame so as to be rotatable about nonhorizontal axes. The soil-working members can be driven from a common shaft which extends generally transverse to the direction of travel.

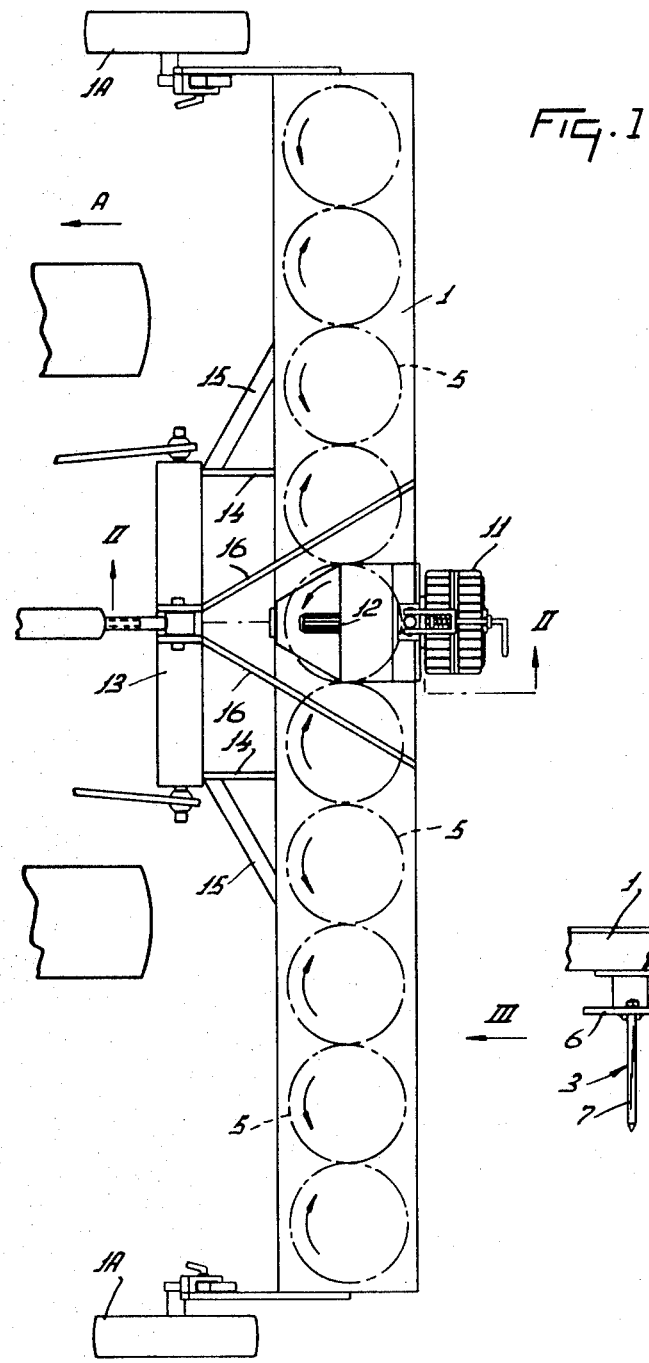
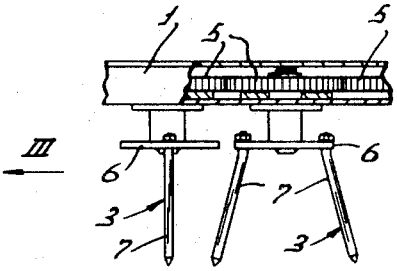

INVENTOR
ARY VAN DER LELY
Mason, Mason & Albright
Attorneys

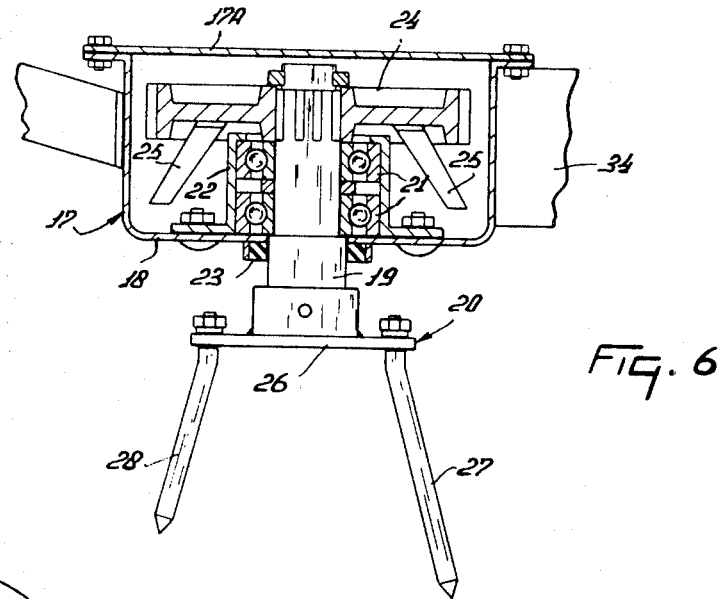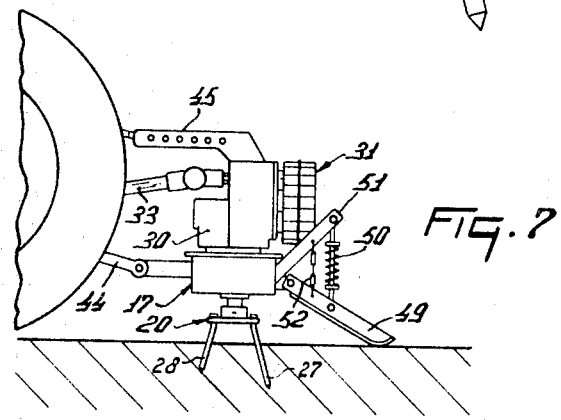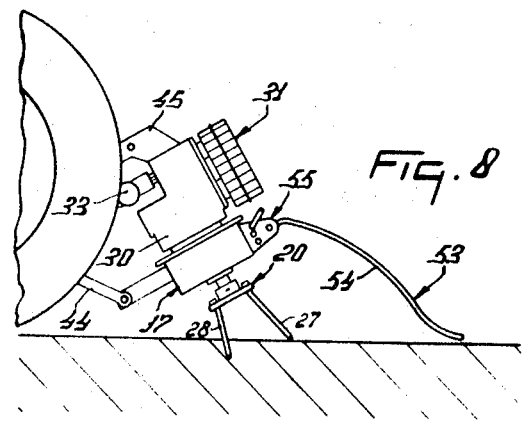

SOIL-CULTIVATING IMPLEMENTS

According to the invention, there is provided a soil-cultivating implement of the kind set forth, wherein each of the shafts that affords said axes of rotation caries a pinion whose teeth are in mesh with those of a pinion carried by at least on neighboring shaft, each shaft being rotatably supported only in a region located adjacent one end thereof and beneath the corresponding pinion.

Figure 2:
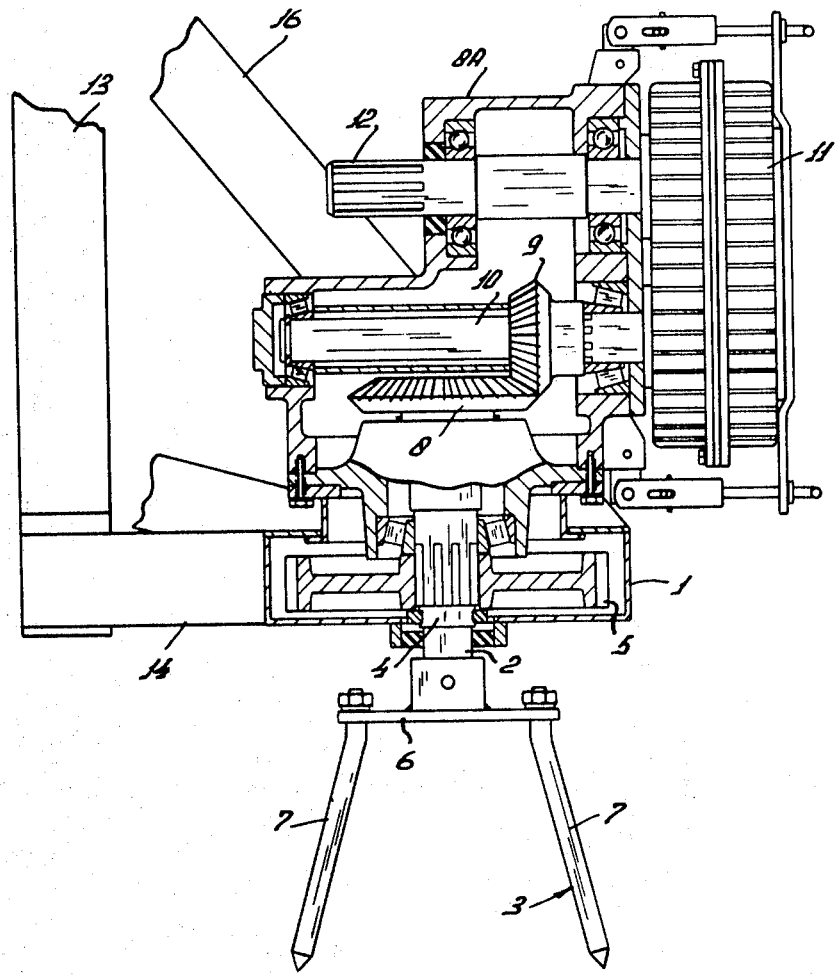
Figure 4:
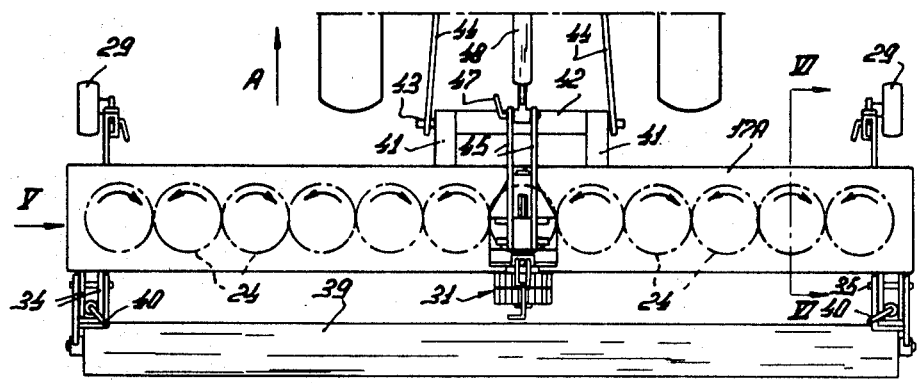
Figure 5:
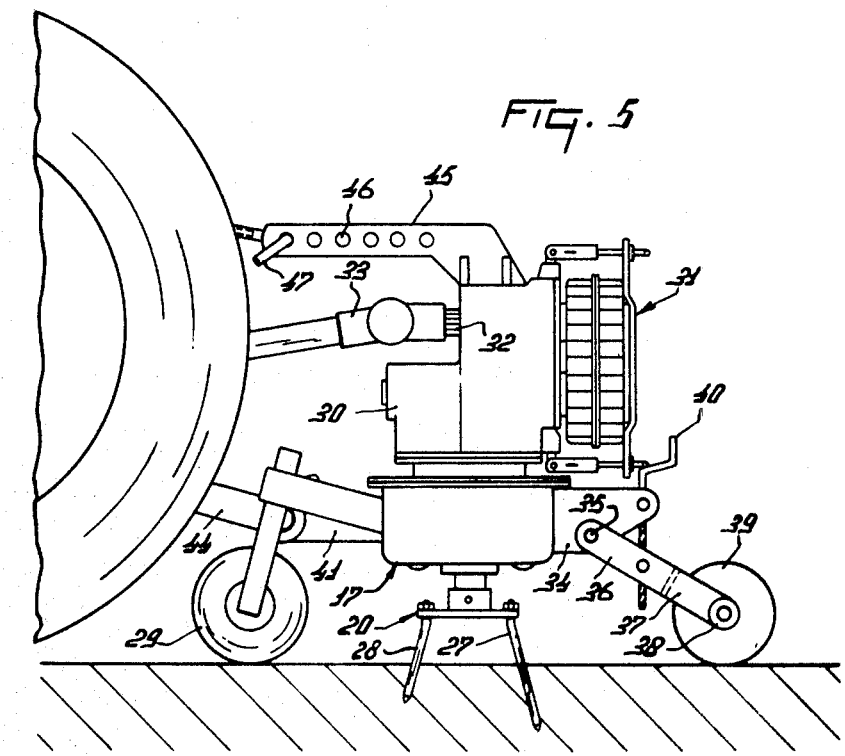

For better understanding of the invention, and to show how the same may be carried into effect, reference will now be made, by way of example, to the accompanying drawings, in which:

FIG. 1 is a plan view of a soil cultivating implement in accordance with the invention coupled to the rear of an agricultural tractor, FIG. 2 is a section, to an enlarged scale, taken on the line II—II of FIG. 1, FIG. 3 is a part-sectional scrap rear elevation as seen in the direction indicated by the arrow III of FIG. 1, FIG. 4 corresponds to FIG. 1 but shows an alternative form of soil-cultivating implement in accordance with the invention, FIG. 5 is a side elevation, to an enlarged scale, as seen in the direction indicated by the arrow V of FIG. 4, FIG. 6 is a section, to an enlarged scale, taken on the line VI—VI of FIG. 4, FIG. 7 corresponds to FIG. 5 but shows the provision of certain alternative parts, and FIG. 8 corresponds to FIGS. 5 and 7 but shows the provision of further alternative parts.

Referring to FIGS. 1 to 3 of the drawings, the soil-cultivating implement which is illustrated has a frame which includes a box-shaped portion 1 that extends substantially horizontally perpendicular to the intended direction of operative travel of the implement which is indicated by an arrow A in FIG. 1 of the drawings. The opposite ends of the frame portion 1 are provided with ground wheels 1A which, as will be evident from FIG. 1 of the drawings, are so arranged that the levels of their axles relative to the level of the portion 1 can be adjusted and maintained in chosen settings with the aid of locking pins. A plurality of soil-working members 3 (there being ten such members 3 in the example which is being described) are rotatably supported by the frame portion 1 with the aid of corresponding vertical or substantially vertical shafts 2 (FIG. 2). The perpendicular distance between neighboring shafts 2 of the row of such shafts should not be greater than 30 centimeters and is preferably about 25 centimeter Each shaft 2 is rotatably journaled in a corresponding bearing 4 carried by the bottom wall of the box-shaped frame portion 1. Each shaft 2 is provided, inside the frame portion 1, with a corresponding spur-toothed pinion 5 and it will be evident from FIGS. 1 and 3 of the drawings that the teeth of the neighboring pinions 5 are in mesh with one another throughout the length of the row of soil working members 3. The lowermost end of each shaft 2 that projects from beneath the frame portion 1 is provided with a plate 6 to which two diametrically opposed rigid tines 7 are secured, said tines 7 diverging downwardly away from the corresponding plate 6. The soil-working members 3 of the implement are arranged in such a way that a substantially vertical plane containing the two tines 7 of one member 3 is substantially perpendicular to a similar plane containing the two tines 7 of the next member 3 along the row thereof.

When, as is preferred, the shafts 2 are spaced apart from one another by distances of about 25 centimeters, the tips of the two tines 7 of each working member 3 are spaced apart from one another by about 30 centimeters so that the 30 centimeters wide strips of soil which are worked by the members 3 during operation of the implement overlap one another to an extent of about 5 centimeters. The uppermost end of one of the center two soil-working members 3 of the row is extended upwardly beyond the frame portion 1 to carry a bevel pinion 8 (FIG. 2) at its uppermost end. The bevel pinion 8 is located in a gearbox 8A which also contains a smaller bevel pinion 9 whose teeth are in driving mesh with those of the bevel pinion 8. The bevel pinion 9 is mounted on a rotary shaft 10 which extends substantially horizontally parallel to the direction A. The gearbox 8A also carries a rotary input shaft 12 that is parallel to the shaft 10 and whose leading splined end projects forwardly from the gearbox 8A in the direction A. The input shaft 12 is intended to be placed in driven connection with the power takeoff shaft of a vehicle, such as the agricultural tractor indicated in FIG. 1 of the drawings, by way of a telescopic transmission shaft (not shown) of known construction that has universal joints at its opposite ends. A shaft 33 of this kind is indicated in FIGS. 5, 7 and 8 of the accompanying drawings. The rearmost ends of the two shafts 10 and 12 are placed in driven connection with one another by way of change-speed gear 11 which is not necessary to describe in detail since it does not form the subject of the present invention. However, briefly, the gear 11 has a casing which contains two pairs of intermeshing pinions of different sizes, said casing being capable of being clamped to the gearbox 8A in the position shown in FIG. 2 of the drawings or in any one of three alternative positions which respectively require inversion of the casing, reversal of the casing or inversion and reversal of the casing as compared with the position illustrated in FIG. 2. Four different transmission ratios between the input shaft 12 and the shaft 10 are thus obtainable.

A generally triangular coupling member 13 is connected to the front of the frame portion 1 by strips 14 that extend parallel to the direction A, struts 15 that diverge rearwardly from the bottom of the coupling member 13 to the frame portion 1 and by supports 16 that converge upwardly, and forwardly relative to the direction A, from the rear of the frame portion 1 to the top of the coupling member 13. The coupling member 13 can be connected to the three-point lifting device of a vehicle, such as the tractor illustrated in FIG. 1 of the drawings, in known manner.

In the use of the soil-cultivating implement which has been described, its coupling member 13 is connected to the three-point lifting device of a tractor or other vehicle in the manner illustrated in FIG. 1 of the drawings and its rotary input shaft 12 is placed in driven connection with the power takeoff shaft of the same tractor or other vehicle. The various soil-working members 3 are thus caused to rotate in the directions indicated in FIG. 1 of the drawings by the rotary drive which reaches them by way of the change-speed gear 11, the shaft 10, the bevel pinions 9 and 8, the shaft 2 of the central member 3 and the various pinions 5. Owing to the large number of adjacent working members which cultivate overlapping strips of land, the soil is worked intensely and evenly to an extent such that even very rough land is ready to receive seeds immediately after a cultivating operation by the implement which has been described. It will be remembered that the provision of the change-speed gear 11 enables the working members 3 to be driven at any one of four different speeds in response to a single speed of rotation of the input shaft 12. A working speed appropriate to the condition of the soil to be cultivated can thus be selected without difficulty. The working level of the tines 7 can be adjusted with the aid of the ground wheels 1A and the angles of inclination of the shafts 2 to the ground surface can be adjusted by lengthening or shortening the upper adjustable lifting link of the three-point lifting device of the towing tractor or other vehicle to tilt the frame portion 1 about an axis that extends substantially horizontally perpendicular to the direction A.

The soil-cultivating implement which is illustrated in FIGS. 4 to 6 of the drawings has a frame which includes a beam 17 (FIG. 6) of channel-shaped cross section, said beam extending substantially horizontally perpendicular to the intended direction of operative travel of the implement which, once again, is indicated in FIG. 4 of the drawings by an arrow A. The lowermost substantially horizontally disposed web 18 of the channel-shaped (in cross section) beam 17 is provided at regular intervals along its length with soil-working members 20 each of which is driven by a corresponding shaft 19 whose axis is perpendicular or substantially perpendicular to the plane of the web 18. In this example, the implement has 12 soil-working members 20. Once again, the longitudinal axes of the shafts 19 should not be spaced apart from one another by more than 30 centimeters the preferred spacing being about 25 centimeters. Each shaft 19 is rotatably mounted in a sleeve 22 with the aid of two ball bearings 21, the bottom of the sleeve 22 being bolted to the web 18 of the beam 17. A seal 23 surrounds each shaft 19 at the point at which that shaft projects downwardly through the web 18 while the upper end of each shaft 19 is provided, above the ball bearings 21, with a spur-toothed pinion 24. The pinions 24 are all located in the space between the limbs of the beam 17 and, as in the preceding embodiment, the teeth of neighboring pinions 24 are in mesh with one another. The bottom of each pinion 24 is provided with downwardly directed blades 25 intended to distribute, by splashing, lubricating oil contained in the channel of the beam 17 during use of the implement. Cover plates 17A close the space between the uppermost edges of the limbs of the beam 17.

Each of the soil-working members 20 carries a plate 26 at its lowermost end, each plate 26 being provided with two diametrically opposed tines 27 and 28 that are disposed in the same manner as the tines 7 of the first embodiment. Once again, a vertical plane containing the tines 27 and 28 of one soil-working member 20 is substantially perpendicularly inclined to a vertical plane containing the tines 27 and 28 of the next soil-working member. In this case, the tines 27 are longer than the tines 28 but, once again, each soil-working member 20 cultivates a strip of land having a width of about 30 centimeters when the shafts 19 are spaced apart at the preferred distance of about 25 centimeters. Vertically adjustable ground wheels 29 are arranged at the opposite ends of the row of soil-working members 20 but in front of that row with respect to the direction A. The mountings of the ground wheels 29 are fastened to the leading limb of the beam 17. The uppermost end of the shaft 19 of one of the center soil-working members 20 of the implement is disposed inside a gearbox 30 which is similar in construction and arrangement to the previously described gearbox 8A. The gearbox 30 has a rotary input shaft 32 and this shaft drives the output members of the gearbox 30 by way of a change-speed gear 31 which is again similar in construction and arrangement to the previously described change-speed gear 11. The forwardly projecting splined end of the input shaft 32 can be placed in driven connection with the power takeoff shaft of a tractor or other vehicle by the previously mentioned transmission shaft 33 having universal joints at its opposite ends.

Pairs of lugs 34 project rearwardly from the rear limb of the beam 17 adjacent the opposite ends of that beam and brackets 36 are pivotally connected to said lugs 34 by substantially horizontal pins 35 that extend perpendicular to the direction A. Each bracket 36 includes a rearwardly projecting arm 37, the lowermost and rearmost ends of the arms 37 carrying corresponding substantially horizontal bearings 38 in which stub shafts at the opposite ends of an elongated roller 39 are rotatably received. The axis of rotation of the roller 39 extends substantially parallel to the longitudinal axis of the beam 17. The angular settings of the brackets 36, and thus of the roller 39, about the pins 35 are governed by screw-threaded cranked spindles 40 that are pivotally connected to the lugs 34 and to the brackets 36 in known manner.

Two substantially horizontal and parallel supports 41 project forwardly of the implement from the leading limb of the beam 17, the leading ends of said supports 41 being interconnected by a beam 42 that extends parallel to the longitudinal axis of the beam 17. Horizontally aligned pins 43 project from the relatively remotest vertical sides of the two supports 41 and these pins can be connected, in known manner, to the free ends of the lower lifting links 44 of the three-point lifting device of an agricultural tractor or other vehicle. Two strips 45 formed with rows of horizontally aligned holes 46 project forwardly of the implement from the top of the gearbox 30 and any chosen pair of holes 46 can cooperate with a horizontal pin 47 to connect the free end of the upper adjustable lifting link 48 of the three-point lifting device to said strips 45 in a pivotal manner.

In the use of the implement which has been described with reference to FIGS. 4 to 6 of the drawings, the implement is connected with the three-point lifting device of a tractor or other vehicle in the manner described and illustrated and its input shaft 32 is placed in driven connection with the power takeoff shaft of the same tractor or other vehicle in the manner which has been described and illustrated. The tractor or other vehicle moves the implement over the ground in the direction A and the 12 soil-working members 20 are caused to rotate in the directions indicated by the arrows shown in FIG. 4 of the drawings. As in the preceding embodiment, the large number of soil-working members 20 cultivate the land in an intensive but even manner, the 12 worked strips overlapping one another by about 5 centimeter so as to leave substantially no areas of soil that are uncultivated. The implement has a total working width of about 300 centimeters. A simple but effective construction is obtained by virtue of the fact that each shaft 19 is rotatably supported at only one region which is located towards one end of that shaft beneath the corresponding pinion 24.

The shorter tines 28 ensure thorough breakup of any top soil crust while the longer tines 27 breakup the underlying soil. The ground wheels 29 can be adjusted vertically to alter the depths of penetration of the tines 27 and 28 while the levelling effect of the roller 39 can be increased or decreased, as required, by appropriate adjustment of the spindles 40. The strips 45 and the pin 47 afford adjusting mechanism by which the point of connection of the upper link 48 to the implement can be changed thereby tilting the implement about a substantially horizontal axis (coincident with the common axis of the pins 43) to change the inclination of the axes of rotation of the shafts 19 to the horizontal.

FIG. 7 illustrates a modification in which the levelling roller 39 is replaced by a screening plate 49 that is turnable about a substantially horizontal axis that extends perpendicular to the intended direction of operative travel of the implement (i.e. the direction A in FIG. 4). The lowermost and rearmost region of the screening plate 49 is urged downwardly into contact with the ground surface by compression springs 50 that extend between supports 51 located adjacent opposite ends of the beams 17 and stops carried by the screening plate 49. Chains 52 which interconnect the supports 51 and the screening plate 49 ensure that the springs 50 do not urge the screening plate 49 too strongly into levelling engagement with the ground surface.

In the arrangement illustrated in FIG. 8 of the drawings, the levelling roller 39 and screening plate 49 are replaced by an open grid or grating 53 formed by a plurality of relatively spaced curved rods 54. It will be noted that the lowermost and rearmost ends of the rods 54 are bent over so as to extend nearly horizontally, said rods 54 preferably all being made from spring steel. THe grid or grating 53 can, as a whole, be maintained in various angular settings with respect to the remainder of the implement with the aid of adjusting members 55 one of which can be seen in outline in FIG. 8 of the drawings. The grating 53 may be arranged so as to be readily releasable from the remainder of the implement.

In the use of the implement as illustrated in FIG. 8 of the drawings, the soil displaced by the working members 20 is thrown against the grid or grating 53 and any large solid constituents thereof, such as stones, roots and other agricultural debris cannot pass through said grid or grating and immediately fall back into the cavity excavated by the soil-working members 20. Fine soil, on the other hand, passes through the gaps in the grid or grating 53 and takes longer to fall to the ground so that it will thus cover any such stones or the like that the implement may have encountered.

It will be seen from FIG. 8 of the drawings that, when the grid or grating 53 is employed, the implement is tilted forwardly to a considerably extent by connecting the upper arm 48 of the three-point lifting device to a different pair of holes 46 with the aid of the pin 47.

It will be noted that the tines 7, 27 and 28 are detachable connected to the plates 6 and 26 and it is to be understood that such rigid spikelike tines may be replaced by knife-edged or resilient tines where these would be more effective having regard to the nature of the particular cultivating work which is envisaged.

Having thus described my invention, what I claim as new and desire to secure by Letters Patent of the United States is:

1. A soil-cultivating implement comprising a frame and a plurality of tined soil-working members mounted on shafts rotatably mounted on said frame to turn about upwardly extending axes, said soil-working members being positioned in a transverse row in side-by-side relationship and including generally downwardly extending tines, the distance between the axes of rotation of adjacent soil-working members being less than the diameter of the path described by the tines of said soil-working members, driving means including a driven connection being provided for the shafts of said soil-working members, said driven connection being housed in a box-shaped frame portion that extends immediately above said soil-working members and substantially horizontally perpendicular to the direction of travel of said implement, an elongated roller being located to the rear of said soil-working members relative to the direction of travel to receive and pulverize clods of earth thrown to the rear of said soil-working members, said roller being mounted to support said implement, at least in part, during operation and being mounted on arms pivotally connected to said frame and adjusting means being connected to said arms to move said roller upwardly and downwardly relative to said frame and said soil-working members.

2. An implement as claimed in claim 1, wherein a power takeoff connection is geared to said driven connection and said takeoff connection extends above said driving means.

3. An implement as claim in claim 1, wherein all of said working members are mounted to be driven through the intermediary of one of said soil-working members arranged approximately centrally of the row of said members and transmission means is connected to said soil-working members, said transmission means including a change-speed gear whereby said members can be driven at different speeds from a power takeoff of the prime mover.

4. An implement as claimed in claim 1, wherein each soil-working member has two downwardly extending tines, said soil-working members being arranged relative to one another whereby a substantially vertical plane containing the tines of one of said soil-working members is substantially perpendicular to a similar plane containing the tines of its adjacent soil-working member.

5. An implement as claimed in claim 1, wherein the axes of rotation of said soil-working members are spaced apart from one another about 25 centimeters.

6. An implement as claimed in claim 1, wherein the frame of said implement is connectable to a three-point lifting device of a tractor to be turnable about an axis that extends substantially horizontally perpendicular to the direction of travel, whereby the inclinations of the axes of rotation of said soil-working members is variable when said frame is turned about its axis.

7. An implement as claimed in claim 1, wherein said implement has hitch means for coupling same to the links of a three-point lifting device of an agricultural tractor and an adjusting mechanism is associated with the frame of said implement and the upper link of said lifting device to tilt the entire frame about an axis which extends substantially horizontally perpendicular to the direction of travel.

* * * * *